Aug. 13, 1957 — O. P. PRACHAR — 2,802,618
FOREIGN OBJECT SEPARATOR
Filed June 29, 1953
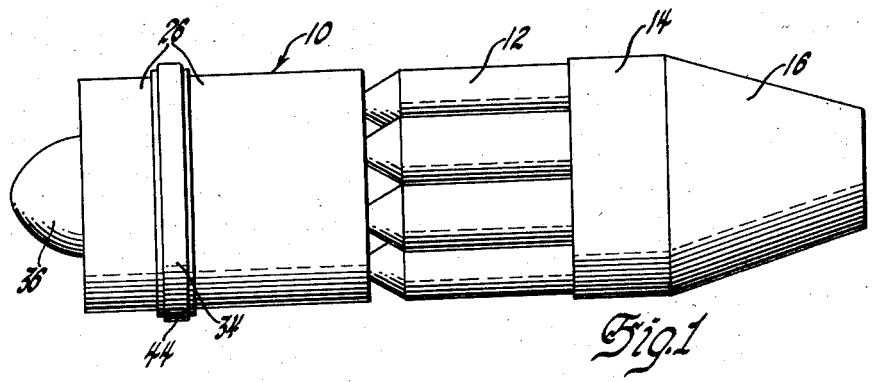
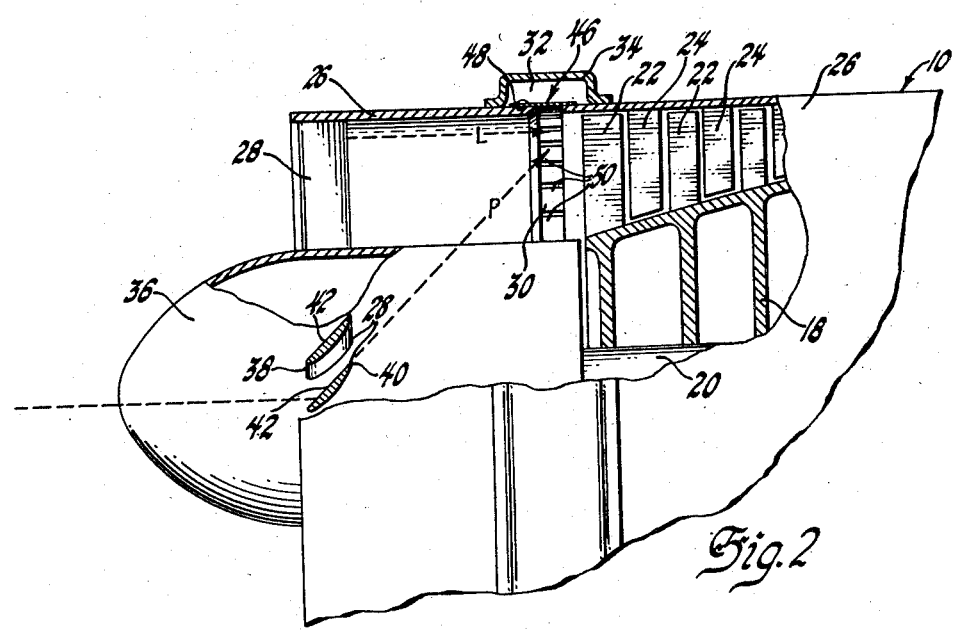
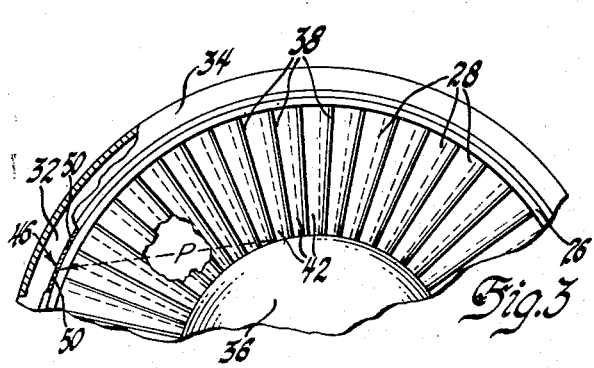
INVENTOR
Otakar P. Prachar
BY Paul Fitzpatrick
ATTORNEY

2,802,618

FOREIGN OBJECT SEPARATOR

Otakar P. Prachar, Indianapolis, Ind., assignor to General Motors Corporation, Detroit, Mich., a corporation of Delaware Application June 29, 1953, Serial No. 364,631

5 Claims. (Cl. 230—132)

This invention relates to foreign object separators, and more particularly to separators for aircraft turbine engines having axial flow compressors.

Aircraft turbine engines are particularly susceptible to damage from foreign objects introduced into the air inlets of the engines. Foreign objects such as stones, gravel, bullets, hail and the like rupture or distort portions of the compressor blading, thereby destroying the balanced condition of the compressor to effect probable destruction of the engine. Aircraft turbine engines are therefore commonly provided with air inlet screens to prevent the entry into the engine of sizable foreign objects. Such inlet screens, while desirable from a safety standpoint, impair the efficiency of the engines by interfering with air flow through the engine and add undesirable weight to the aircraft.

An object of the invention is to provide a means whereby fluid current machines, such as axial flow compressors, are protected against the entrance of foreign objects without the addition of auxiliary screening devices.

The invention is accomplished by modification of the fluid current machines to cause them to function as foreign object separators.

Further objects and advantages of the present invention will be apparent from the following description, reference being had to the accompanying drawings wherein a preferred form of the present invention is clearly shown.

In the drawings:

Fig. 1 is a side elevation of a turbojet engine incorporating the invention.

Fig. 2 is an enlargement, partially broken away, of the compressor portion of Fig. 1 illustrating a modification of the compressor in accordance with the invention; and Fig. 3 is a partial front elevation, partially broken away, of the compressor of Fig. 2.

Referring now to the drawings, and more particularly to Fig. 1, the invention is shown as incorporated in an axial flow turbojet engine which includes a compressor 10 that supplies air to the combustors 12 which feed motive fluid to the turbine 14 to drive the same and the connected compressor 10; the jet discharge from the turbine exhaust cone 16 being utilized to drive an associated aircraft. Referring to the remaining figures, the compressor rotor 18, which may be of disk type as shown, is driven by the turbine 14 through a shaft 20 suitably supported in the engine by bearings not shown. The compressor blading is of the usual axial flow air foil type and includes annular rows of rotor blades 22 carried by the rotor 18 to impart velocity to the air and annular rows of stator blades 24 secured to the fixed annular outer casing 26 of the compressor to change the velocity to pressure. The structure described above is conventional and the invention comprises locating the inlet guide vanes 28 of the compressor forward of their normal location adjacent the first rotor blade row so the vanes function as the directing elements of a foreign object separator.

The outer casing 26 is formed with an annular capture slot 30 proximate the first rotor blade row. The slot 30 opens radially into a preferably airtight annular foreign object collection chamber 32 formed by an annular casing 34 suitably secured to the casing 26. The inlet guide vanes 28 project radially between the fixed outer casing 26 and the inlet nose 36 and are angled with respect to the rotor axis to pre-swirl the air for proper entry to the rotor blading in accordance with conventional compressor practice. The amount of pre-swirl may be varied somewhat for different designs by varying the turning angle of the inlet guide vanes. The guide vanes 28 are located at a suitable distance forward of the capture slot 30 to direct foreign objects therein for retention in the collection chamber 32. The guide vanes 28 are so spaced from each other circumferentially as to overlap when viewed from an axial direction, that is, the trailing edges 40 of each vane are behind the leading edges 38 of adjacent vanes so that foreign objects entering from an axial direction are unable to pass between the vanes without change in direction.

When a foreign object enters in axial direction between adjacent guide vanes, it necessarily strikes the front face 42 of a vane and is deflected thereby to leave the vane along some straight path as represented by the path P. This path will correspond substantially to the turning angle of the vane and the foreign object will have a rearward and tangentially outward movement respective to the nose 36. The vanes 28 are located a suitable distance L ahead of the capture slot 30 so that the redirected movement of the foreign objects will lodge them in the collection chamber 32, thereby preventing their impingement on the rotor blading. The distance L is based on the path of a foreign object that strikes the vanes at their inner ends, that is, proximate the hub 36 and such a path is substantially along a line tangential to the hub and angled respective to the rotor axis equally to the turning angle of the vanes.

Foreign objects that strike the vanes radially outward of the hub 36 tend to follow paths parallel the paths of foreign objects that strike proximate the hub, and therefore strike the outer casing 26 at points between the training edges of the vanes and the capture slot. Since the path of such an object prior to striking the internal cylindrical surface of the casing 26 is along a chord transverse to the axis of the casing, the object tends to follow the surface along a helical path as a result of its circumferential and axial components of velocity until it lodges in the capture slot. In some instances, it may be desirable to locate additional capture slots forward of the capture slot 30 that is based on the path of an object that strikes proximate the hub, especially where the vanes are of that twisted type wherein the turning angle increases with radius.

During operation, collection chamber 32 is preferably open only to the interior of the casing 26 to prevent ram air pressure bleedoff from the compressor. The foreign objects settle in the bottom of the collection chamber 32 as a result of gravity influence for subsequent removal when the engine is inoperative, as by a closure 44. The tendency for captured foreign objects to fall back into air flow path of the compressor may be minimized by axially offsetting the collection chamber 32 with respect to the capture slot 30, or may be practically eliminated by providing the capture slot with a one-way valve, such as an annular, highly flexible flap valve 46 peripherally secured along its forward edge 48 to the outer casing 26. The flap valve 46 may be made of a metallic ring longitudinally slotted around its rearward edge to form a circular row of radially swingable reeds 50. It should be obvious that the width of the capture slot may be varied to suit particular installations and requirements and that the distance L decreases with increases in vane turning angle and with increases in the inner radius of the vanes.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:

1. An axial flow compressor comprising a housing having a cylindrical inlet chamber, a rotor supported in and by the housing rearward of the chamber, radial blading for the compressor including rotor blades supported on the rotor and stator blades supported in and by the housing, radial inlet guide vanes for the compressor supported in the chamber by the housing, and a capture slot in the housing opening into the chamber between the inlet guide vanes and blading, the inlet guide vanes being located sufficiently forward of the slot to deflect foreign objects that enter the inlet into the slot to prevent damage to the blading.

2. An axial flow compressor comprising a housing having a cylindrical inlet chamber, a rotor supported in and by the housing rearward of the chamber, radial blading for the compressor including rotor blades supported on the rotor and stator blades supported in and by the housing, radial inlet guide vanes for the compressor supported in the chamber by the housing, and a peripheral capture slot in the housing opening into the chamber between the inlet guide vanes and blading, the inlet guide vanes being located at such distance ahead of the capture slot as to align the capture slot with lines normal to the inlet guide vane axes from the inner ends thereof and angled respective to the rotor axis as the inlet guide vanes so that the inlet guide vanes deflect foreign objects that enter the inlet into the slot to prevent damage to the blading.

3. An axial flow compressor comprising a housing having a cylindrical inlet chamber, a rotor supported in and by the housing rearward of the chamber, radial blading for the compressor including rotor blades supported on the rotor and stator blades supported in and by the housing, radial inlet guide vanes for the compressor supported in the chamber by the housing, a peripheral capture slot in the housing opening into the chamber between the inlet guide vanes and the blading, and a peripheral collection chamber in the housing communicating with the capture slot, the inlet guide vanes being located sufficiently forward of the capture slot to deflect foreign objects that enter the inlet into the capture slot and into the collection chamber to prevent damage to the rotor.

4. An axial flow compressor as claimed in claim 3 wherein the inlet guide vanes are located at such distance ahead of the capture slot as to align the capture slot with lines normal to the inlet guide vane axes from the inner ends thereof and angled respective the rotor axis as the inlet guide vanes.

5. An axial flow compressor as claimed in claim 3 including a peripheral one-way flap valve in the capture slot to insure against the reentry of foreign objects into the inlet chamber from the collection chamber.

References Cited in the file of this patent

UNITED STATES PATENTS

| | | |
|---|---|---|
| 2,435,990 | Weiler | Feb. 17, 1948 |
| 2,631,425 | Nordfors | Mar. 17, 1953 |
| 2,636,666 | Lombard | Apr. 28, 1953 |
| 2,647,366 | McCann | Aug. 4, 1953 |